United States Patent
Reusche et al.

(10) Patent No.: US 7,575,226 B2
(45) Date of Patent: *Aug. 18, 2009

(54) LIQUID AERATION SYSTEM AND METHOD

(75) Inventors: Thomas K. Reusche, Elburn, IL (US);
Philip E. Chumbley, Aurora, IL (US);
Mike Ressl, Western Springs, IL (US);
James McHugh, Downers Grove, IL (US)

(73) Assignee: Allied Precision Industries, Inc., Elburn, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/016,050

(22) Filed: Jan. 17, 2008

(65) Prior Publication Data

US 2008/0110836 A1    May 15, 2008

Related U.S. Application Data

(62) Division of application No. 11/189,081, filed on Jul. 25, 2005, now Pat. No. 7,331,569.

(60) Provisional application No. 60/645,055, filed on Jan. 19, 2005.

(51) Int. Cl.
*B01F 3/04*    (2006.01)

(52) U.S. Cl. .................. 261/36.1; 261/120; 261/142

(58) Field of Classification Search ............... 261/34.1, 261/36.1, 91, 120, 142, DIG. 75; 210/242.2
See application file for complete search history.

(56) References Cited

U.S. PATENT DOCUMENTS

| | | | |
|---|---|---|---|
| 2,172,646 A | 9/1939 | Walker | |
| 2,877,051 A | 3/1959 | Cushman | |
| 3,756,578 A | 9/1973 | McGurk | |
| 3,836,130 A | 9/1974 | Earhart | |
| 3,840,216 A | 10/1974 | Smith | |
| 4,060,574 A * | 11/1977 | Verner et al. | 261/77 |
| 4,086,306 A | 4/1978 | Yoshinaga | |
| 4,145,383 A | 3/1979 | Randall | |
| 4,166,086 A | 8/1979 | Wright | |
| 4,278,546 A | 7/1981 | Roesler | |
| 4,442,045 A | 4/1984 | Sciolla | |
| 4,448,689 A | 5/1984 | von Nordenskjold | |
| 4,482,510 A | 11/1984 | Khudenko | |
| 4,690,756 A | 9/1987 | Van Ry | |
| 4,724,086 A * | 2/1988 | Kortmann | 210/747 |
| 4,780,217 A * | 10/1988 | Petersen | 210/758 |

(Continued)

FOREIGN PATENT DOCUMENTS

DE    3818650    12/1988

*Primary Examiner*—Scott Bushey
(74) *Attorney, Agent, or Firm*—McAndrews, Held & Malloy, Ltd.

(57) ABSTRACT

A system for aerating liquid within a liquid retention structure including a liquid delivery tube in fluid communication with a gas exchange chamber and a pump. The gas exchange chamber includes an air inlet and a gas outlet. The pump is configured to pump liquid within the liquid retention structure through the liquid delivery tube and into the gas exchange chamber so that harmful gases contained within the liquid escape from the liquid and exit through the gas outlet. Fresh air enters into the gas exchange chamber through the air inlet and is absorbed into the liquid within the gas exchange chamber.

7 Claims, 7 Drawing Sheets

U.S. PATENT DOCUMENTS

| | | |
|---|---|---|
| 5,071,550 A | 12/1991 | Bernhardt |
| 5,336,399 A | 8/1994 | Kajisono |
| 5,385,665 A * | 1/1995 | Neuhaus ................ 210/167.26 |
| 5,980,100 A | 11/1999 | Haegeman |
| 6,394,428 B2 | 5/2002 | Hinada |
| 7,331,569 B2 * | 2/2008 | Reusche et al. ............ 261/36.1 |
| 2003/0127754 A1 | 7/2003 | Ruzicka |
| 2005/0121645 A1 | 6/2005 | Prescott |

* cited by examiner

LIQUID AERATION SYSTEM AND METHOD

RELATED APPLICATIONS

This application is a division of U.S. application Ser. No. 11/189,081 entitled "Liquid Aeration System and Method," filed Jul. 25, 2005, now U.S. Pat. No. 7,331,569, which, in turn, relates to and claims priority benefits from U.S. Provisional Patent Application No. 60/645,055 entitled "Pond Breather," filed Jan. 19, 2005, both of which are incorporated by reference herein in their entireties.

BACKGROUND OF THE INVENTION

Embodiments of the present invention generally relate to a system and method for aerating a liquid, and more particularly to a system and method for aerating water within a pond and allowing undesirable gases to escape the water when the pond is iced over.

Fish ponds for personal enjoyment, as well as aquaculture, are found on various premises, including homes and businesses. Typically, expensive fish are kept in these ponds. As such, great care is taken to provide a suitable, safe environment for the fish. In order to maintain a suitable, safe environment for the fish, adequate levels of dissolved oxygen need to be maintained within the pond. At the same time, the presence of harmful gases, such as carbon dioxide or ammonia, need to be minimized.

Harmful gases may be introduced into the water through the decomposition of leaves and other organic matter, and fish waste. When the pond is iced over, these gases may build up to toxic concentrations, thereby endangering the fish.

Various systems and methods exist for allowing these harmful gases to escape and oxygen to enter the water. The most common method is to provide an opening in the ice through which gases may escape.

Conventional pond bubblers/aerators pump air into the pond. The air then bubbles to the surface. Gas exchange occurs as the bubbles break the water surface. Ice formation at the surface is typically hindered due to the turbulence caused by the bubbles. This method of aerating water, however, provides gas exchange that depends on the size of the bubbles and the amount of time the bubbles are in contact with the water. Additionally, any aeration that occurs is often localized, and icing may still occur at cold temperatures.

Heaters are commonly used to maintain openings in the ice, or in some cases, keep the pond free of ice. Heaters typically range in power from 100 watts up to 1500 watts, and therefore, may be expensive to operate. Additionally, heaters are often thermostatically controlled with a large hysteresis, so the water temperature in the pond may vary dramatically. Although heaters maintain a hole in the ice, aeration with heaters is achieved only at the passive interface between the water and the air. Also, water heaters may be domed over by snow and ice, thus sealing off the open water surface from the atmosphere.

Some systems use pumps that move relatively warmer water from the bottom of the pond to the surface where it is exposed to the atmosphere. The ground temperature is typically above freezing except during very cold freezes. The heat within the ground is transmitted to the water at the bottom of the pond. Thus, the water temperature at the bottom of the pond is typically several degrees warmer than at the top of the pond. Pumping the warmer water to the surface creates a localized area of warmer water that does not freeze. However, moving the water to the surface also exposes that water to the colder atmosphere. As such, the water may be supercooled, which may be very harmful to the fish.

Thus, a need exists for a more efficient system and method of aerating liquid within a water retention structure, such as a pond. Additionally, a need exists for a cost-effective system and method of aerating liquid that is not susceptible to being domed over by ice or snow. Further, a need exists for a system and method of liquid aeration that maintains liquid within the water retention structure at a safe temperature.

SUMMARY OF THE INVENTION

Certain embodiments of the present invention provide a system for aerating liquid within a liquid retention structure. The system includes a main body, such as a main tubular body, having an outer wall, such as a cylindrical wall, and a liquid delivery tube having first and second ends. An extension member or tube may be secured to, and downwardly extend from, the main body. The system may also include a flotation member radially extending from the outer wall. The liquid delivery tube may be positioned within the coaxial main body. A heating element, such as a heater coil may be wrapped around at least a portion of the liquid delivery tube. Optionally, the heating element may be a heater cord that may be routed through the liquid delivery tube.

The system also includes a gas exchange chamber connected to, and in fluid communication with, the liquid delivery tube. The gas exchange chamber includes at least one opening, such as an air inlet and a gas outlet and is in fluid communication with the liquid delivery tube. A single opening within the gas exchange chamber may serve as the air inlet and the gas outlet. For example, the system may include a hole(s), slit, slots, circumferential openings, or the like that allow toxic gas to exit and fresh air to enter the gas exchange chamber.

A pump connects to the second end of the liquid delivery tube so that the pump is in fluid communication with the liquid delivery tube. The pump is configured to pump liquid within the liquid retention structure through the liquid delivery tube and into the gas exchange chamber so that harmful gases contained within the liquid escape from the liquid and exit through the gas outlet, while fresh air enters into the gas exchange chamber through the air inlet and is absorbed into the liquid within the gas exchange chamber.

The gas exchange chamber is supported above the surface of the liquid so that the gas exchange chamber does not become covered by snow and ice. The gas exchange chamber further may include first and second caps separated by a gap, wherein fresh air enters the gap through the air inlet, and the pump is configured to pump water into the gap so that the water absorbs the fresh air. The gas exchange chamber may include a top cap and a divider downwardly extending from the top cap into an interior cavity within an upper portion of the main tubular body. The divider separates a fresh air area from a harmful gas area within the interior cavity.

Certain embodiments of the present invention provide a method of aerating liquid within a liquid retention structure. The method includes pumping liquid from remote sections of the liquid retention structure into a gas exchange chamber, drawing fresh air into the gas exchange chamber through an air inlet, exposing the pumped liquid to fresh air within the gas exchange chamber so that the pumped liquid absorbs the fresh air, allowing harmful gases that escaped from the pumped liquid to pass out of the gas exchange chamber through a gas exhaust, and draining the liquid that absorbed the fresh air back into the liquid retention structure. The method may also include heating the liquid as it is pumped into the gas exchange chamber. Additionally, the method may include allowing a tube member connected to the gas exchange chamber to freeze into an ice layer formed within the liquid retention structure.

Certain embodiments of the present invention also provide a system for aerating liquid within a liquid retention structure. The system includes a main body having an outer wall, a liquid delivery tube having first and second ends, a gas exchange chamber connected to the first end of the liquid delivery tube, and a pressure relief passage configured to relieve pressure underneath a layer of ice formed over the liquid within the liquid retention structure. The pressure relief passage may be formed through the main tubular body.

Certain embodiments of the present invention provide a system for aerating a liquid that includes multiple subsystems electrically connected, and/or daisy-chained, to one another.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

Figure 1:
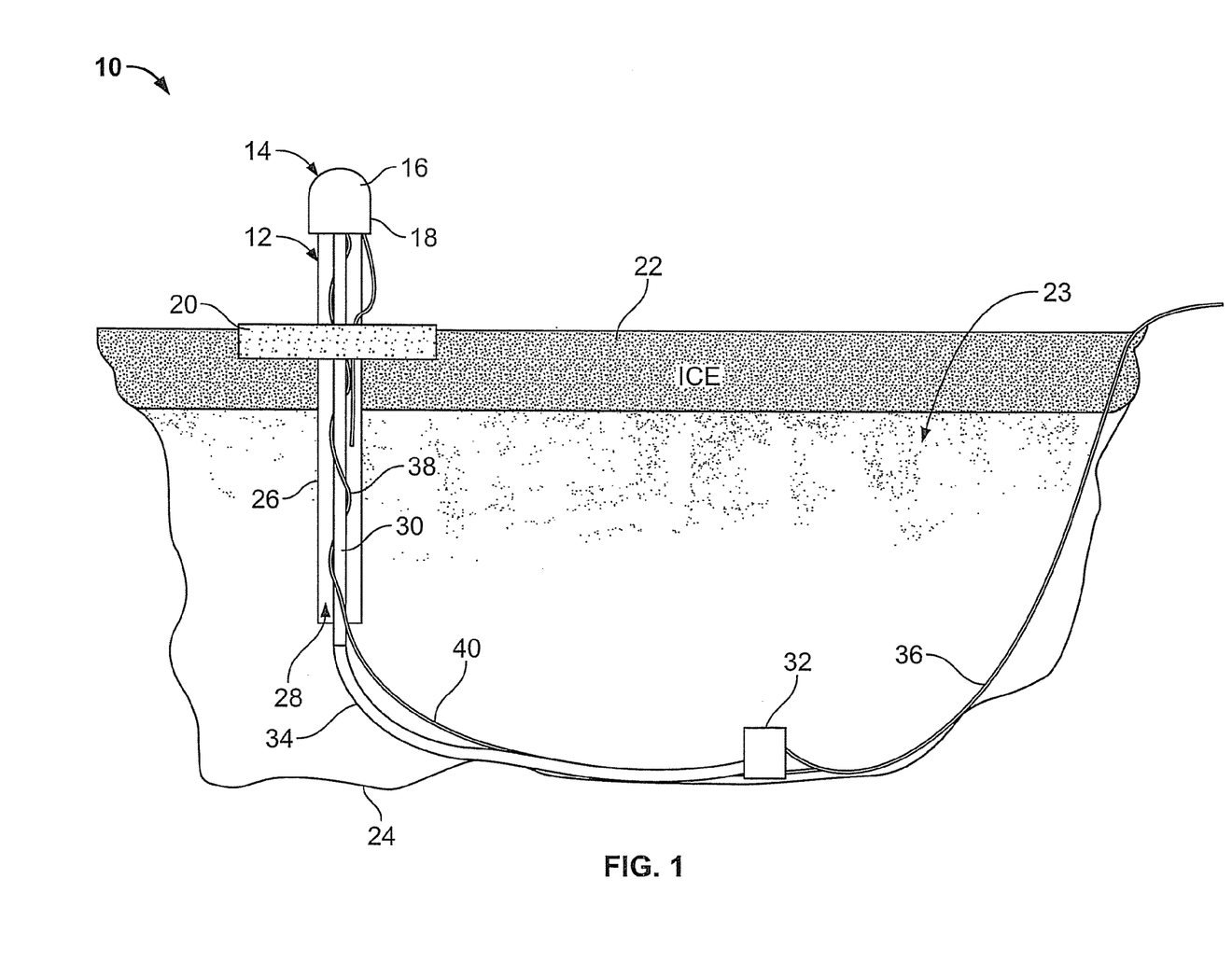
FIG. 1 illustrates a side view of a liquid aeration system according to an embodiment of the present invention.

FIG. 1 illustrates a side view of a liquid aeration system 10 according to an embodiment of the present invention. The system 10 includes a main tubular body 12 having a gas exchange chamber 14 protected by a cover 16 located at an upper end 18. The main tubular body 12 is connected to a float 20 that radially extends from a circumferential wall of the tubular body 12. Optionally, in order to provide adequate flotation, the system 10 may be constructed of a naturally buoyant material and, as such, not depend on the float 20.

The float 20 may be a ring of buoyant material, such as Styrofoam, or an airtight tube filled with air. In particular, the float 20 may be a rubber tube or membrane that may be filled with air. Preferably, the float 20 provides enough buoyancy to ensure that the gas exchange chamber 14 remains above a surface of water within a water retention structure 23, such as a pond. For example, the system 10 may be configured so that the gas exchange chamber 14 is approximately 6 inches (15.24 cm) above a water surface, or ice surface 22. In general, the gas exchange chamber 14 is supported at a height above the water and ice so that it does not dome over with snow, thereby maintaining open air inlets and outlets.

Alternatively, instead of (or in addition to) a float 20, the system 10 may include a support structure, such as a plurality of adjustable legs, that extend from the main body 12 and/or the gas exchange chamber 14, and are configured to support the gas exchange chamber 14 above a base 24 of the pond 23.

The tubular main body 12 includes an outer wall 26 defining an interior cavity 28. An interior liquid delivery tube 30 is positioned within the interior cavity 28 and is in fluid communication with the gas exchange chamber 14. The system 10 is configured to allow the ice 22 to form around the outer wall 26 proximate the float 20, thereby securing the tubular main body 12 within the ice 22. That is, the system 10 securely freezes into the ice 22. When the ice 22 melts, the float 20 ensures that the system 10 does not sink.

The delivery tube 30 is connected to a liquid pump 32 by way of a flexible tube 34. The pump 32 may be supported by the base 24 of the pond 23. Optionally, the pump 32 may be suspended below the main body 12 in the pond 23 through the flexible tube 34. The pump 32 is connected to a power source (not shown) through insulated wiring 36. Alternatively, the pump 32 may be battery operated.

A low wattage heating coil 38 may be wrapped around the delivery tube 30 and electrically connected to the pump 32 or the power source (not shown) by way of insulated wiring 40. The heating coil 38 operates to heat the delivery tube 30, thereby heating liquid therein. Heating the areas of the system 10 that are exposed to cool air minimizes heat transfer from the water to the cold air and prevent condensation and the air intakes and outlets from freezing.

Alternatively, a heating cord may be used instead of, or in addition to, the heating coil 38. The heating cord may be routed through the interior of the delivery tube 30.

In operation, the pump 32 acts to pump liquid, such as water from the bottom surface 24 of the pond, into the tube 34. The water at the bottom surface 24 of the pond is typically warmer than the ice 22 or water that is proximate the ice 22. The warmer water is pumped through the tube 34 into the delivery tube 30. The warmer water may be further heated through the heater coil 38, which is wrapped around the delivery tube 30. The heater coil 38 heats the water to a slightly higher temperature, so that when the water comes in contact with the cool air, the temperature of the water drops to that of the water at the bottom 24 of the pond, or at the very least, does not freeze or become supercooled.

The water is pumped from the delivery tube 30 into the gas exchange chamber 14. In the gas exchange chamber 14, toxic or otherwise harmful gases contained within the water escape from the water, while the water is re-oxygenated by absorbing the fresh air within the gas exchange chamber 14. The re-oxygenated, refreshed water is then passed through the interior cavity 28 and drains back into the pond. In this manner, liquid within the pond is circulated.

Figure 2:
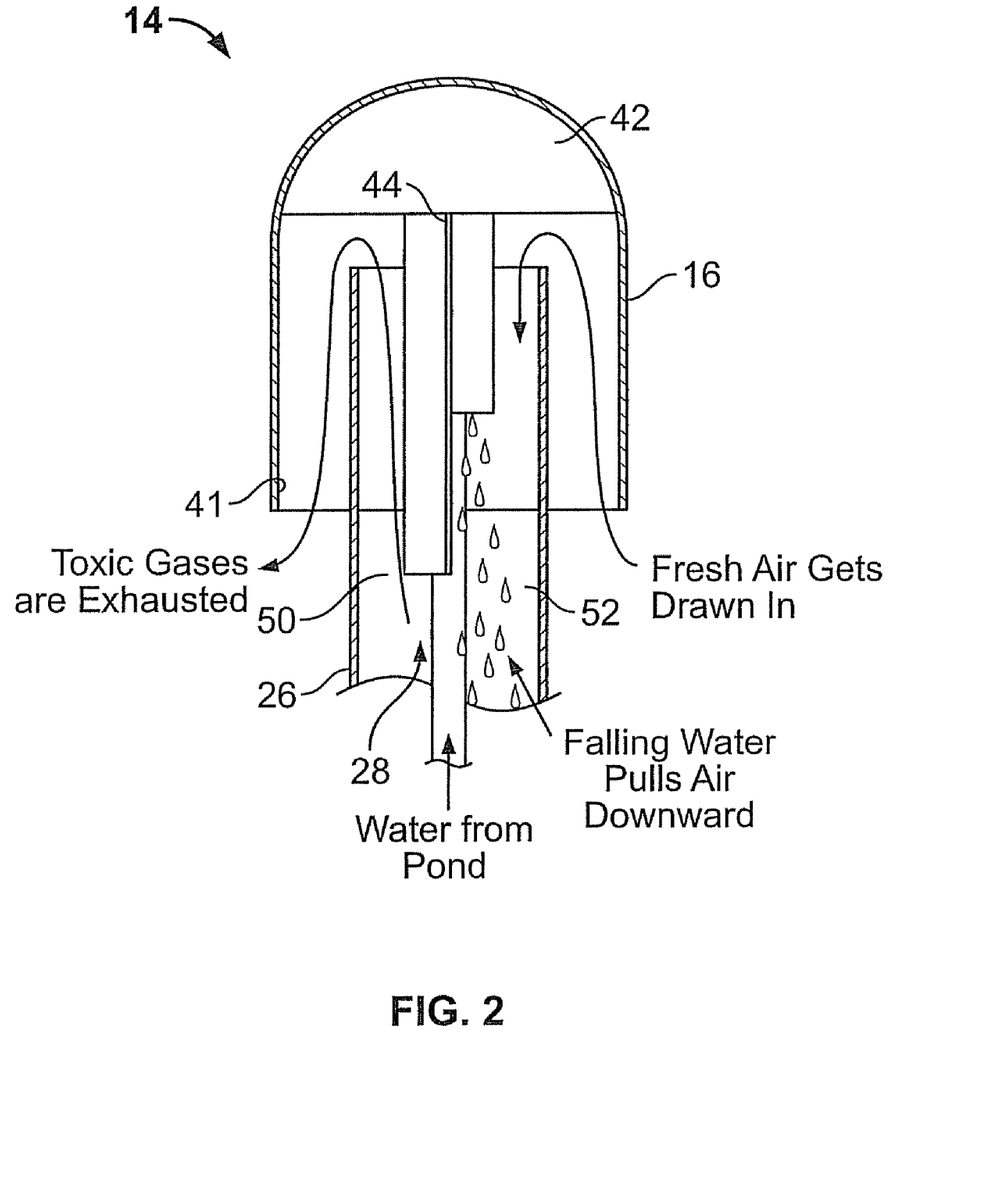
FIG. 2 illustrates an interior cross-sectional view of a gas exchange chamber according to an embodiment of the present invention.

FIG. 2 illustrates an interior cross-sectional view of the gas exchange chamber 14. As mentioned above, the gas exchange chamber 14 includes the cover 16, which includes an open bottom 41. An end cap 42 downwardly extends from underneath the top of the cover 14. A divider 44 downwardly extends from a central portion of the end cap 42 into the interior cavity 28 of the outer wall 26. The divider 44 acts to segregate an upper portion of the interior cavity 28 into a toxic gas exhaust area 50 and a fresh air area 52.

Fresh air enters the gas exchange chamber 14 through the open bottom 41 of the cover 14. Water from the pond is pumped into the gas exchange chamber 14. As the water enters the gas exchange chamber 14, it absorbs fresh air within the gas exchange chamber 14. As the water contacts the air, toxic or otherwise gases contained within the water escape from the water and pass into the toxic gas exhaust area 50. Additionally, the splashing of the water within the gas exchange chamber 14 assists in releasing dissolved gases from the water. The toxic gases then pass through the toxic gas exhaust area 50 and escape the gas exchange chamber 14 through the open bottom 41 of the cover 14. The remaining water is then re-oxygenated by the fresh air within the gas exchange chamber 14. As the water falls back toward the pond, the water drags along fresh air within the fresh air area 52, thereby making room for additional fresh outside air to enter the fresh air area 52. As such, water is continually aerated and cleaned within the gas exchange chamber 14.

Figure 3:
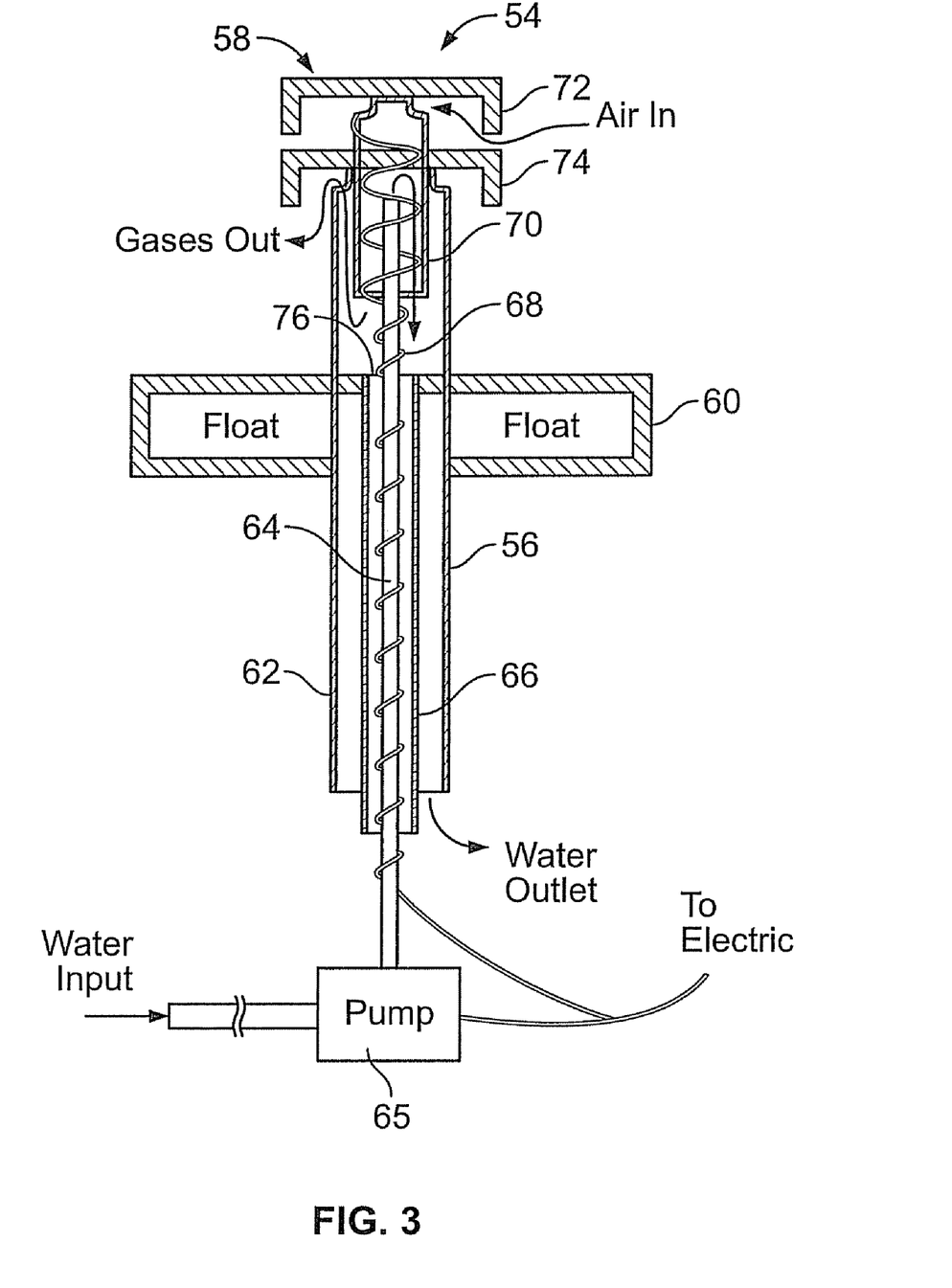
FIG. 3 illustrates an interior cross-sectional view of a liquid aeration system according to an embodiment of the present invention.

FIG. 3 illustrates an interior cross-sectional view of a liquid aeration system 54 according to an embodiment of the present invention. The system 54 is similar to the system 10, described above with respect to FIGS. 1 and 2, with some exceptions.

The system 54 includes a main tubular body 56 connected to a gas exchange chamber 58 and a float 60. For the sake of clarity, the cover is not shown on the gas exchange chamber 58. The main body 56 includes a cylindrical outer wall 62 housing a coaxial delivery tube 64 and a coaxial outlet tube 66 that is positioned around a portion of the delivery tube 64. The delivery tube 64 is in fluid communication with a pump 65. A heater coil 68 is wound around the delivery tube 64, similar to the heater coil 38 discussed above with respect to FIG. 1.

As shown in FIG. 3, the outlet tube 66 does not upwardly extend from the float 60. Optionally, however, the outlet tube 66 may upwardly extend from the float 60. Also, optionally, the system 54 may not include the outlet tube 66.

The gas exchange chamber 58 includes an inner sleeve 70 positioned through centers of an upper cap 72 and a lower cap 74. The heater coil 68 may also wrap around the inner sleeve 70. The inner sleeve 70 may be formed of a metal, such as copper or aluminum, in order to promote heat flow.

In operation, liquid is pumped into the gas exchange chamber 58 by way of the delivery tube 64. The liquid may be heated through the heater coil 68. Water exits the top of the delivery tube 64 into an interior of the inner sleeve 70. Toxic or otherwise harmful gases contained within the water escape from the water when it contacts the air within the gas exchange chamber 58, and pass out of the gas exchange chamber through an exhaust outlet located underneath the lower cap 74. Fresh air enters the gas exchange chamber 58 between the upper and lower caps 72 and 74. The water within the gas exchange chamber 58 contacts the fresh air. The water drags the fresh air down as it falls back toward the pond. The freshened, re-oxygenated water then drains into the outlet tube 66 through a drain 76. The freshened, re-oxygenated water then drains back into the pond through the outlet tube 66.

By drawing water from a remote part of the pond, cleaning it and re-oxygenating it, and delivering it back to the pond through an output tube, a current is established within the pond that assists in mixing the water throughout the pond. The water circulation provides clean water having a uniform oxygen concentration within the pond.

Figure 4:
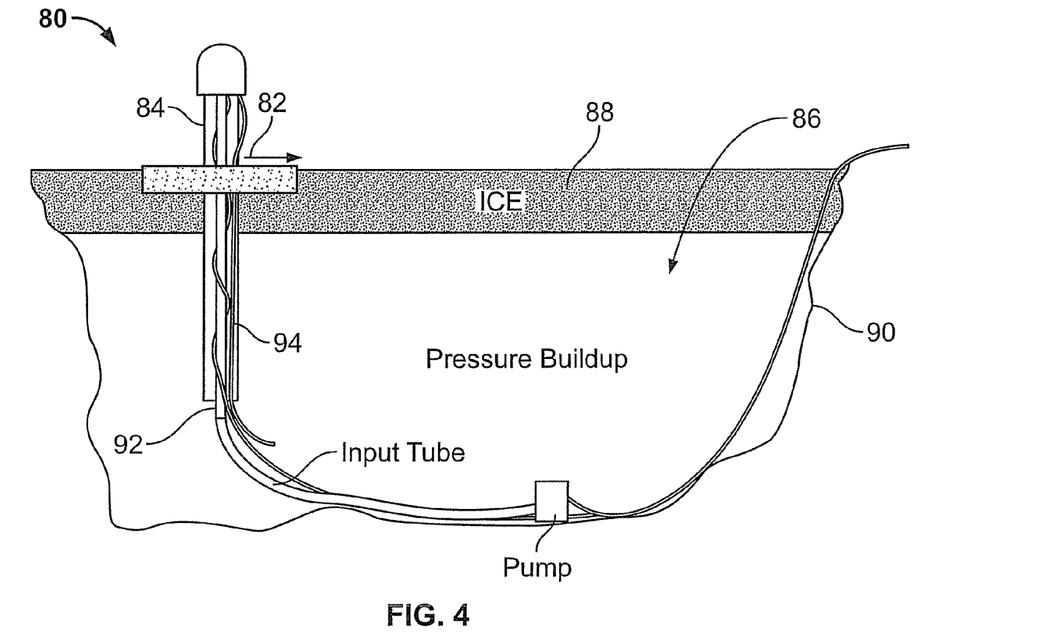
FIG. 4 illustrates a side view of a liquid aeration system having a pressure relief passage formed through a tubular main body according to an embodiment of the present invention.

FIG. 4 illustrates a side view of a liquid aeration system 80 having a pressure relief passage 82 formed through a tubular main body 84 according to an embodiment of the present invention. When a pond 86 freezes over, the ice 88 freezes into the earth at the sides 90 of the pond, effectively creating a seal. As ice continues to form on the underside of the ice layer 88, water pressure builds up in the pond 86 because ice occupies more space than the water from which it forms. If there is any opening in the ice layer, water is pushed out as a result of the pressure buildup. To prevent water from being pushed up, and overflowing the tube in our invention, a secondary path, such as the relief passage 82, is formed through the tubular main body 84, thereby allowing water from underneath the ice to overflow onto the top of the ice surface.

The relief passage 82 may be formed slightly above the expected ice surface. As water is pushed up into the tube 92, the water may exit via the relief passage 82 to relieve the pressure under the ice 88. The heater coil or cord 94 is passed through the relief passage 82 and along the exposed side of the tube 84 in order to provide an unfrozen path for the water to overflow onto the surface of the ice 88.

Figure 5:
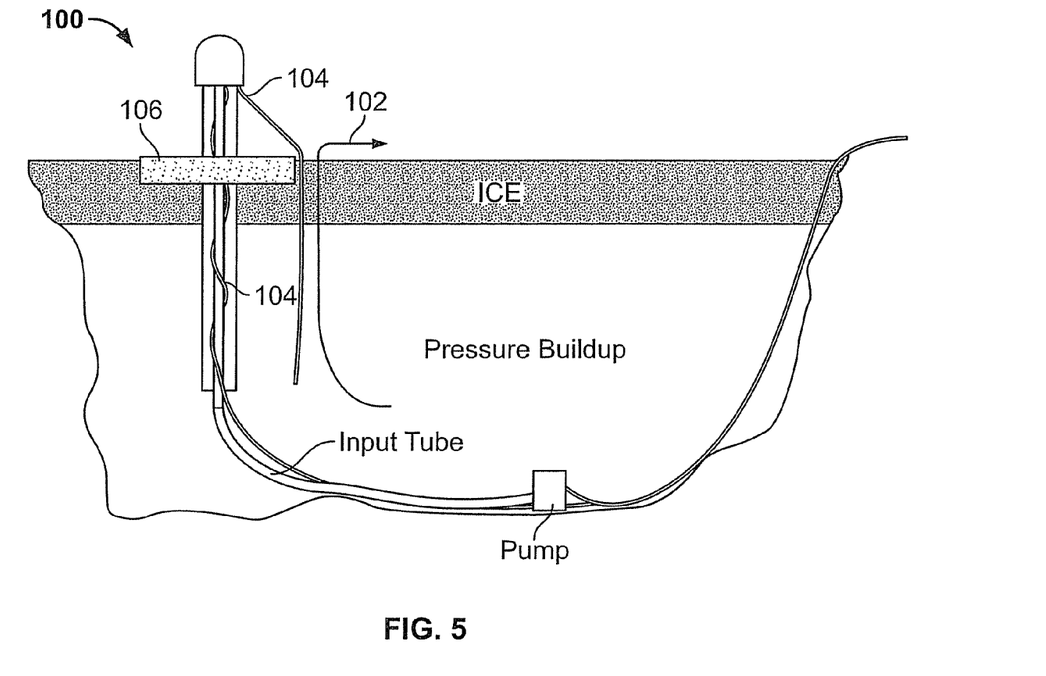
FIG. 5 illustrates a side view of a liquid aeration system having a pressure relief passage according to an embodiment of the present invention.

FIG. 5 illustrates a side view of a liquid aeration system 100 having a pressure relief passage 102 according to an embodiment of the present invention. The pressure relief passage 102 is formed by allowing the heater coil or cord 104 to dangle into the water, either outside of the float 106, or through the float 106, where the heater coil or cord 104 will keep a small column of ice melted in order to provide a liquid path for the overflow water to reach the surface.

Figure 6:
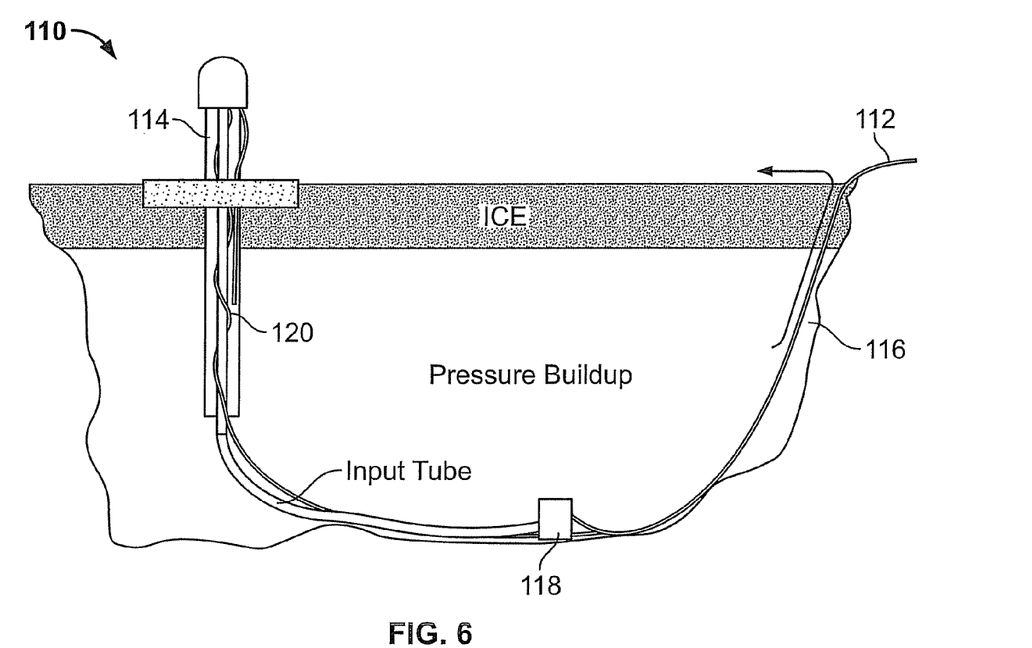
FIG. 6 illustrates a side view of a liquid aeration system having a distal pressure relief passage according to an embodiment of the present invention.

FIG. 6 illustrates a side view of a liquid aeration system 110 having a distal pressure relief passage 112 according to an embodiment of the present invention. The pressure relief passage 112 is distally located from the main body 114 of the system 110. In operation, heat is provided along the electrical cord 116 that connects to the pump 118 and/or heater coil 120.

Figure 7:
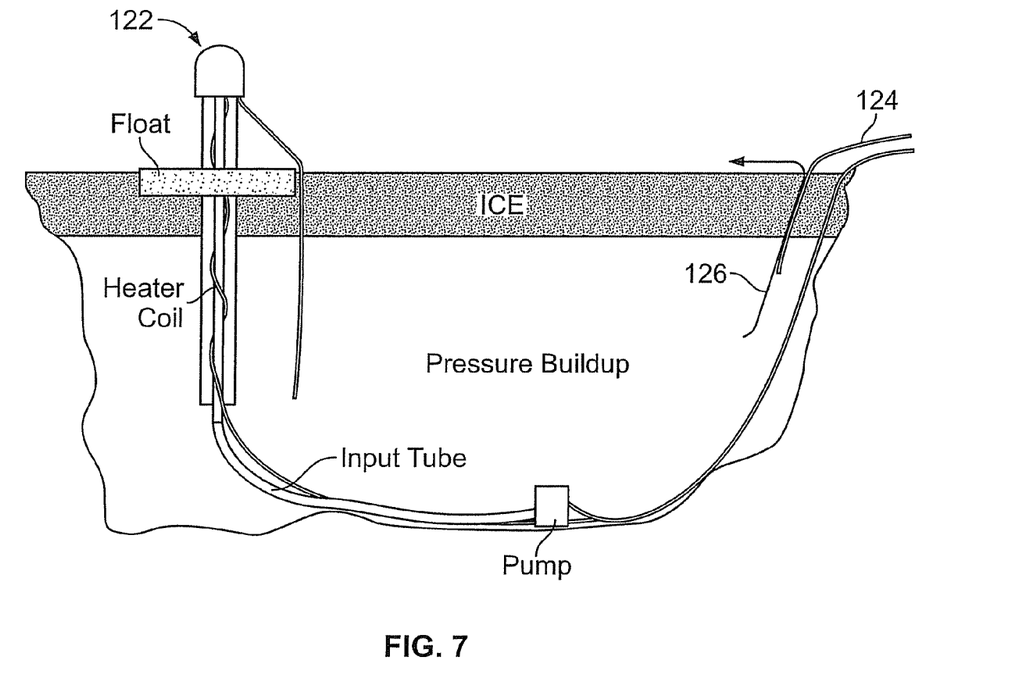
FIG. 7 illustrates a side view of a liquid aeration system having a distal pressure relief passage according to an embodiment of the present invention.

FIG. 7 illustrates a side view of a liquid aeration system 122 having a distal pressure relief passage 124 according to an embodiment of the present invention. In this embodiment, a separate heater cord 126 passes through the ice and keeps open the pressure relief passage 124.

Figure 8:
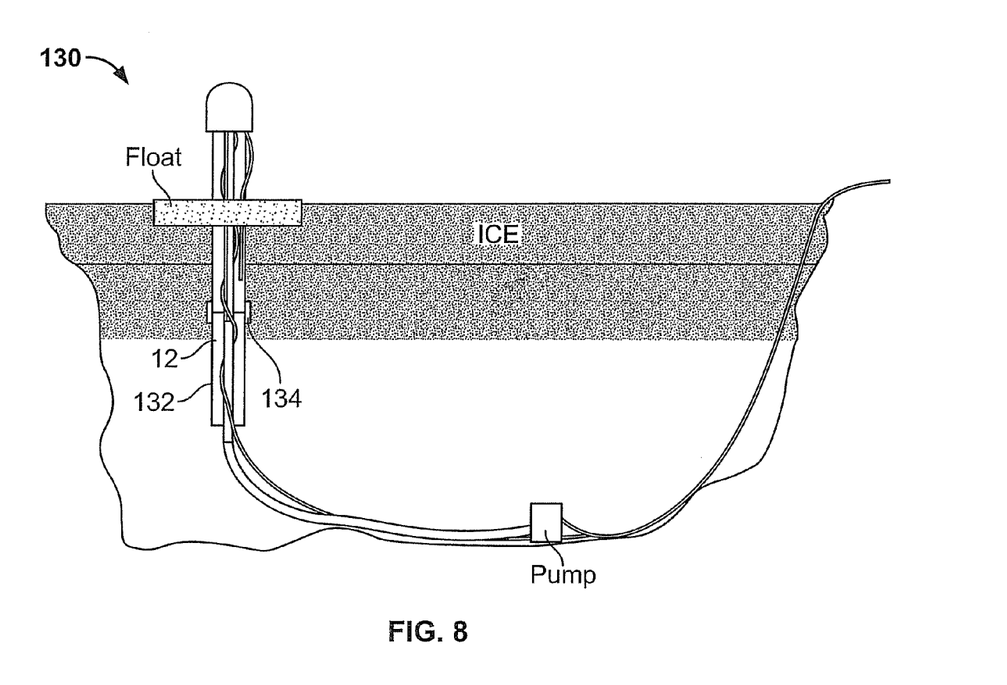
FIG. 8 illustrates a side view of a liquid aeration system having an extension tube according to an embodiment of the present invention.

FIG. 8 illustrates a side view of a liquid aeration system 130 having an extension tube 132 according to an embodiment of the present invention. The extension tube 132 is secured to the main tubular body 12 through a securing member 134, such as a clamp, joint, fastener, or other such device. The extension tube 132 provides penetration through thick layers of ice, thereby allowing the system 130 to aerate water below thick layers of ice.

Figure 9:
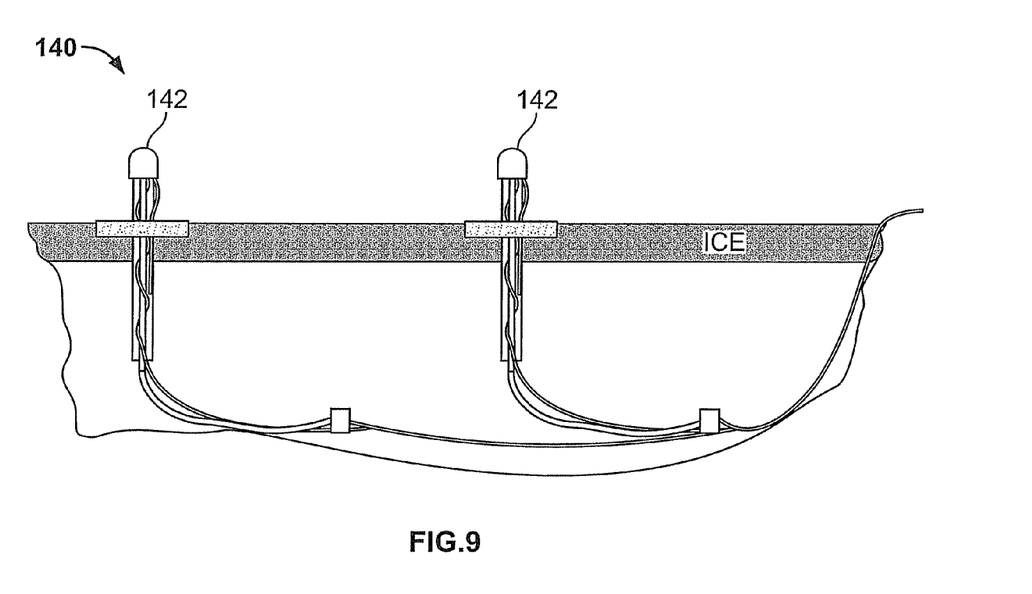
FIG. 9 illustrates a side view of a daisy-chained liquid aeration system according to an embodiment of the present invention.

FIG. 9 illustrates a side view of a daisy-chained liquid aeration system 140 according to an embodiment of the present invention. As shown in FIG. 9, the system 140 includes multiple liquid aeration subsystems 142, such as the liquid aeration systems discussed above. Each subsystem 142 may be electrically linked in parallel to one another in order to maintain multiple, open holes in the ice simultaneously. The system 140 may be used in a larger pond that may, or may not, have distinct but separable (by ice formation) volumes where fish might be located. The subsystems 142 are configured to allow easy electrical connection to one another in much the same way that Christmas lights are connected, in parallel. For example, one of the subsystems 142 may include a female electrical connector, while another includes a male electrical connector. Further, each subsystem 142 may include both male and female electrical connectors. Alternatively, each subsystem 142 may be configured to act as an electrical connection hub for at least one other device used in a star connection topology.

Figure 10:
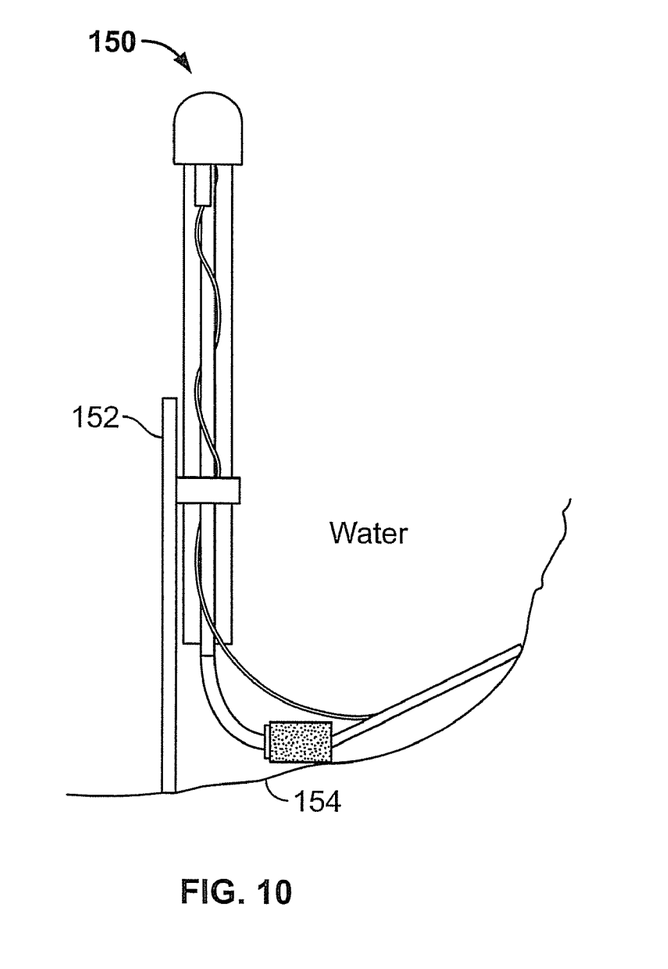
FIG. 10 illustrates a side view of a liquid aeration system according to an embodiment of the present invention.

FIG. 10 illustrates a side view of a liquid aeration system 150 according to an embodiment of the present invention. Instead of using a flotation member, the system 150 is instead clamped, fastened, or otherwise secured to a stake 152, post, or other such member mounted into the base 154 of a water-retention structure, such as a pond.

Figure 11:
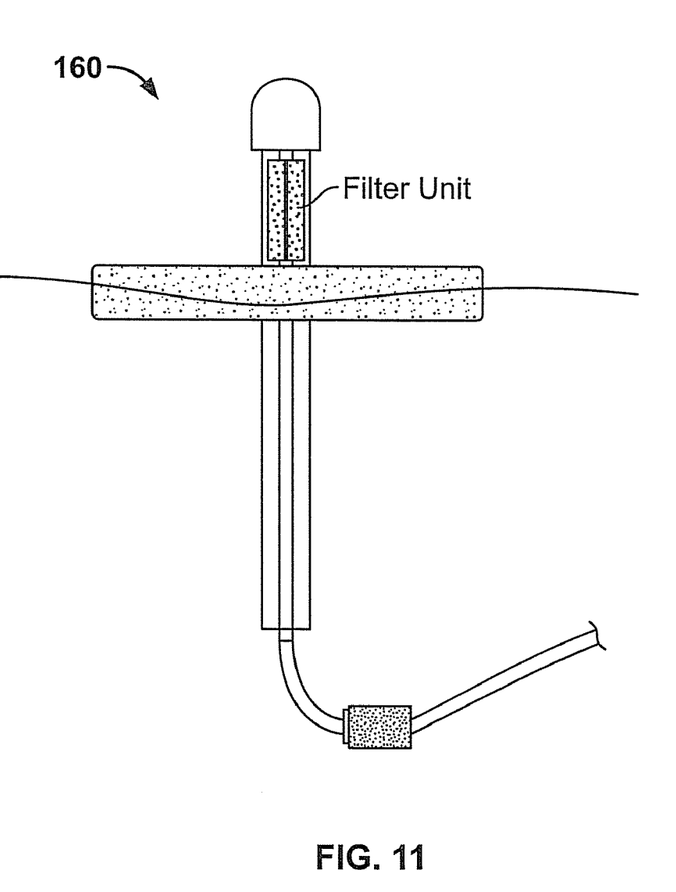
FIG. 11 illustrates a side view of a liquid aeration system having a filter according to an embodiment of the present invention.

FIG. 11 illustrates a side view of a liquid aeration system 160 having a filter medium 162 according to an embodiment of the present invention. Water that is passed through the system 160 is passed through the filer medium 162, which may be configured to filter out harmful materials, such as ammonia and nitrates. The filter medium 162 may contain charcoal, mesh, and/or aerobic bacteria, and be used as a trickle filter.

Thus, embodiments of the present invention provide a more efficient system and method of aerating liquid within a water retention structure, such as a pond. The systems and methods described are cost-effective because expensive heating systems are not used. Further, because the gas exchange chamber is maintained at a suitable height above the surface of the water and ice, the air inlets and outlets within the chamber are not susceptible to being domed over by ice or snow. Further, the low wattage heater that wraps around the delivery tube heats the water therein and ensures that it does not freeze or become supercooled.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. A system for aerating liquid within a liquid retention structure, comprising:
 a main body having an outer wall;
 a liquid delivery tube positioned within said main body;
 a heating element proximate said liquid delivery tube;
 a gas exchange chamber connected to said liquid delivery tube, said gas exchange chamber being in fluid communication with said liquid delivery tube; and
 a pressure relief passage configured to relieve pressure underneath a layer of ice formed over the liquid within the liquid retention structure.

2. The system of claim 1, wherein said pressure relief passage is formed through said main body.

3. The system of claim 1, further comprising a flotation member radially extending from said outer wall.

4. The system of claim 1, further comprising a pump in fluid communication with said liquid delivery tube, said pump being configured to pump liquid within the liquid retention structure through said liquid delivery tube and into said gas exchange chamber so that harmful gases contained within the liquid escape from the liquid and exit through said gas exchange chamber, while fresh air enters into said gas exchange chamber and is absorbed into the liquid within said gas exchange chamber.

5. The system of claim 1, further comprising an extension member downwardly extending from said main body.

6. The system of claim 1, wherein the system is electrically connected to an additional system for aerating a liquid within a liquid retention structure.

7. The system of claim 1, further comprising a filter medium.

* * * * *